United States Patent [19]

Charlton

[11] 4,100,467

[45] Jul. 11, 1978

[54] TYPE OF SINGLE PHASE INDUCTION MOTOR ASSEMBLY

[76] Inventor: Willis Herbert Charlton, 2/A Byrarong Ave., Wollongong, New South Wales, Australia

[21] Appl. No.: 730,652

[22] Filed: Oct. 7, 1976

[30] Foreign Application Priority Data

Sep. 20, 1973 [AU] Australia .............................. 4921/73

[51] Int. Cl.² ............................................. H02P 1/44
[52] U.S. Cl. ................................ 318/220 R; 318/227
[58] Field of Search ......................... 318/138, 216–218, 318/220 R, 221 R, 221 E, 222, 225 R, 227

[56] References Cited

U.S. PATENT DOCUMENTS

| | | | |
|---|---|---|---|
| 2,770,764 | 11/1956 | McAdie et al. | 318/227 X |
| 3,321,661 | 5/1967 | Toth et al. | 318/138 |
| 3,348,109 | 10/1967 | Wright | 318/222 X |
| 3,463,933 | 8/1969 | Kompelien | 318/227 X |
| 3,471,761 | 10/1969 | Katz | 318/227 |

Primary Examiner—Gene Z. Rubinson
Attorney, Agent, or Firm—Richards, Harris & Medlock

[57] ABSTRACT

A squirrel cage induction motor assembly in which the stator of the motor has one winding energized directly from the supply and a second controlled winding which is displaced spatially on the stator from the first, the second winding being energized through a circuit which produces a voltage which is shifted in phase from the mains supply so that the motor has starting and running characteristics similar to those of a two phase induction motor.

1 Claim, 1 Drawing Figure

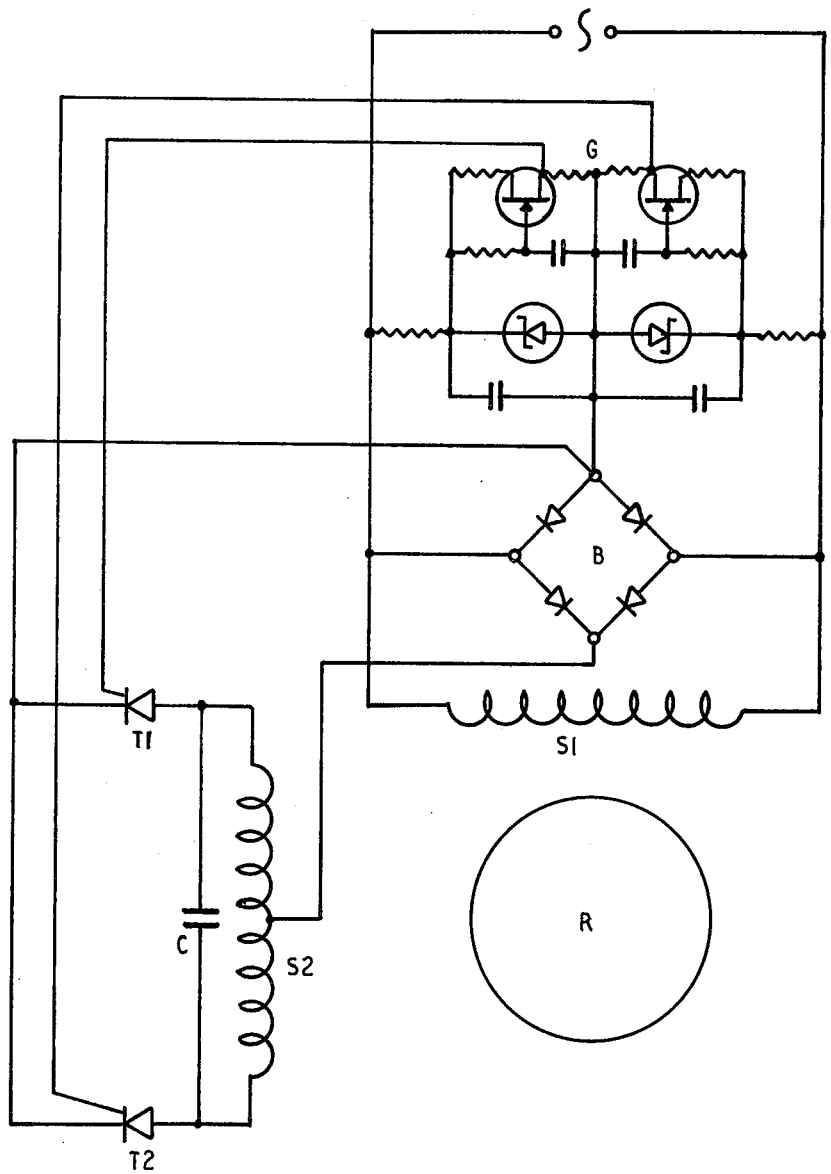

TYPE OF SINGLE PHASE INDUCTION MOTOR ASSEMBLY

This is a continuation of application Ser. No. 506,519, filed Sept. 16, 1974 now abandoned.

The present invention relates to an improved electric motor assembly utilising a squirrel cage type of induction motor for operation from a single phase, alternating current supply.

The object of the invention is to provide a simple, robust, single-phase-operated, induction type motor assembly having starting and running characteristics similar to a two-phase induction motor. A motor assembly having such properties and characteristics is well suited to a wide variety of industrial and domestic applications.

The invention consists in an electric motor assembly comprising an induction motor having a squirrel cage rotor and a stator, the stator having a first winding and a second controlled winding, said windings being displaced spatially on the stator, said first winding being arranged to be energized by a single phase fixed frequency supply and said second winding being arranged to be energized from said supply through electric circuit means acting to produce a voltage the fundamental frequency component of which is shifted in time phase with respect to the supply voltage wave form. The spatial displacement of the said windings may be conveniently one half pole pitch and the shift in phase one quarter period.

In a typical embodiment of the invention the said shift in time phase may be one quarter period. A capacitor or capacitors to effect commutation of the currents in the controlled winding and circuit elements to provide gate signals of appropriate phase to thyristors or equivalent switching devices are provided, the arrangement being such that the winding currents interact with the rotor to produce a motoring torque at all speeds from standstill to near synchronous speed, the direction of motoring torque being reversed by phase reversal of the thyristor gate signals.

In order that the nature of the invention may be better understood and put into practice, one form thereof is hereinafter described by way of example with reference to the accompanying diagrammatic drawing which comprises a circuit diagram of one embodiment of this invention.

The first stator winding $S_1$ is supplied directly from the fixed frequency supply. The second stator winding $S_2$ herein called the controlled winding is displaced spatially by one half pole pitch relative to winding $S_1$, is supplied from the fixed frequency source through diode bridge circuit B and thyristors $T_1$ or $T_2$. The point in the supply voltage cycle at which the thyristors $T_1$ and $T_2$ are switched is controlled by the gate signal source G which operates in a conventional manner. At each switching action one thyristor is switched to its conducting state and commutation capacitor C causes the other thyristor to cease conduction. The capacitor C also serves to modify the wave form of the current in the winding. The time-phase displacement between the voltage applied to stator winding $S_1$ and the fundamental frequency component of the periodic voltage across the controlled stator winding $S_2$ depends on the point in the fixed frequency supply voltage cycle at which the thyristors are switched and includes in this embodiment of the invention a time-phase displacement of one quarter period of the supply voltage.

If the spatial winding displacement is one half pole pitch and the time-phase displacement is one quarter period, electrical conditions within the motor are analogous to those pertaining in a conventional two-phase induction motor. It should however be made clear that any other desired spatial displacement or time phase displacement may be used.

The optimum design values for capacitor rating, time-phase displacement between winding voltages, spatical displacement between stator windings and winding specifications in each particular case are determined by computer analysis based on a mathematical model of the motor assembly and interconnected components.

The general properties and advantages of this invention may be summarised as follows:

(1) The magnitude and time-phase of the fundamental frequency component of voltage across the controlled winding is independent of motor speed.

(2) Both stator windings remain in circuit and contribute to the power output of the motor affording a potential improvement in utilisation of iron and copper or correspondingly a higher horse-power output for a given frame size.

In contrast with most existing types of single phase induction motor assembly, the present invention does not incorporate or require a speed-operated mechanical switch. Elimination of the mechanical switch also improves the safety of the motor in that sparking occurring at the contacts of the mechanical switch may constitute a fire or explosion hazard.

The embodiment of the invention described above is given by way of example and is described in such detail only as will permit those skilled in the art to put the invention into practice.

I claim:

1. A single phase induction motor assembly having a rotor and a stator comprising:

first and second stator windings spaced ninety electrical degrees on the stator core with respect to one another and coupled to the rotor;

a single phase fixed frequency supply voltage source interconnected to said first stator winding, such that the frequency of the voltages and currents in said first and second stator windings and the speed of the motor are determined by said fixed frequency supply voltage source;

first and second thyristors interconnected in series with said second stator winding;

a rectifier bridge circuit interconnected to said single phase fixed frequency supply voltage source and said first and second thyristors for supplying direct current voltage to said first and second thyristors;

a commutating capacitor interconnected in parallel with said second stator winding and interconnected to said first and second thyristors; and circuit means interconnected to said single phase fixed frequency supply voltage source and said first and second thyristors for alternately energizing said first and second thyristors in synchronism with said single phase fixed frequency supply voltage source, such that said first and second thyristors apply a periodic voltage to said second stator winding, said periodic voltage having a fundamental frequency shifted in time phase with respect to said single phase fixed frequency supply voltage source to induce currents in said windings, such that said winding currents interact with the rotor to produce a motoring torque at all speeds from standstill to near synchronous speed determined externally by said single phase fixed frequency supply voltage source.

* * * * *